United States Patent
Schorr et al.

(10) Patent No.: US 7,670,058 B2
(45) Date of Patent: Mar. 2, 2010

(54) CAGE FOR ANTIFRICTION BEARINGS WITH ROLLERS

(75) Inventors: Gerhard Schorr, Baunach (DE); Hans-Juergen Fandre, Oerlenbach (DE); Reiner Baeuerlein, Schweinfurt (DE); Michael Stadmueller, Bamberg (DE)

(73) Assignee: Schaeffler KG, Herzogenaurach (DE)

( * ) Notice: Subject to any disclaimer, the term of this patent is extended or adjusted under 35 U.S.C. 154(b) by 480 days.

(21) Appl. No.: 11/569,614

(22) PCT Filed: May 21, 2005

(86) PCT No.: PCT/DE2005/000938

§ 371 (c)(1),
(2), (4) Date: Jan. 23, 2007

(87) PCT Pub. No.: WO2005/116469

PCT Pub. Date: Dec. 8, 2005

(65) Prior Publication Data

US 2007/0248297 A1    Oct. 25, 2007

(30) Foreign Application Priority Data

May 28, 2004    (DE) .................... 10 2004 026 291

(51) Int. Cl.
*F16C 33/46* (2006.01)
(52) U.S. Cl. .................... 384/580; 384/572; 384/574
(58) Field of Classification Search .............. 384/450, 384/470, 477, 572, 576, 577, 580; 29/898.067
See application file for complete search history.

(56) References Cited

U.S. PATENT DOCUMENTS

| | | | | |
|---|---|---|---|---|
| 2,327,237 A * | 8/1943 | Baden | ................... | 29/898.067 |
| 2,772,128 A * | 11/1956 | Schaeffler et al. | ........... | 384/580 |
| 3,110,529 A * | 11/1963 | Schaeffler | .................. | 384/580 |
| 3,416,210 A * | 12/1968 | Einaudi | ................. | 29/898.067 |
| 3,582,165 A * | 6/1971 | Koch | .......................... | 384/580 |
| 4,472,006 A * | 9/1984 | Goransson et al. | .......... | 384/576 |
| 4,629,339 A * | 12/1986 | Morinaga | .................... | 384/576 |
| 4,702,628 A * | 10/1987 | Watanabe | .................... | 384/580 |
| 5,172,986 A * | 12/1992 | Yokota | ........................ | 384/580 |
| 5,584,583 A * | 12/1996 | Hidano | ........................ | 384/470 |
| 5,647,674 A * | 7/1997 | Ohashi et al. | ................ | 384/580 |
| 5,772,338 A * | 6/1998 | Hillmann et al. | ............. | 384/470 |
| 6,196,728 B1 * | 3/2001 | Wahler et al. | ................ | 384/580 |
| 6,599,019 B2 * | 7/2003 | Matsui et al. | ............... | 384/572 |
| 6,715,927 B1 * | 4/2004 | Torisawa et al. | ............. | 384/576 |
| 6,955,476 B1 * | 10/2005 | Murai | ......................... | 384/580 |

FOREIGN PATENT DOCUMENTS

| | | | |
|---|---|---|---|
| DE | 0 347 630 A | | 12/1989 |
| DE | 100 21 089 Y | | 2/2001 |
| EP | 0754872 Y | | 1/1997 |
| GB | 2 022 721 A | | 12/1979 |
| GB | 1562140 | | 3/1980 |
| JP | 06249246 A | * | 9/1994 |

\* cited by examiner

*Primary Examiner*—Marcus Charles
(74) *Attorney, Agent, or Firm*—Lucas & Mercanti, LLP

(57) ABSTRACT

A cage for antifriction bearings with rollers, which has a first lateral edge, a second lateral edge, webs, and pockets, which are adjacent to one another along the periphery and which serve to accommodate rollers. The webs and the lateral edges are formed together as a single piece, and the flanks have a finished profile-milled contour. The finished contour is a negative reproduction of a positive outer cutting contour of one profiling cutter.

39 Claims, 6 Drawing Sheets

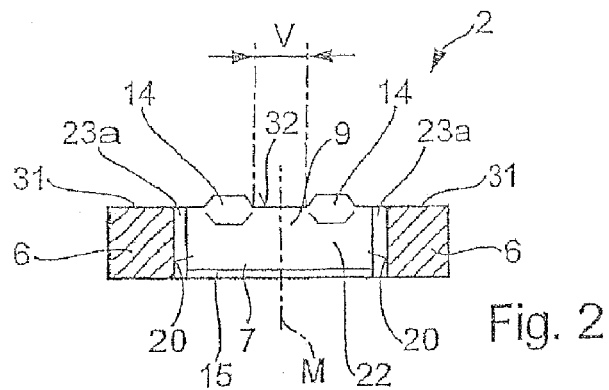
Fig. 2
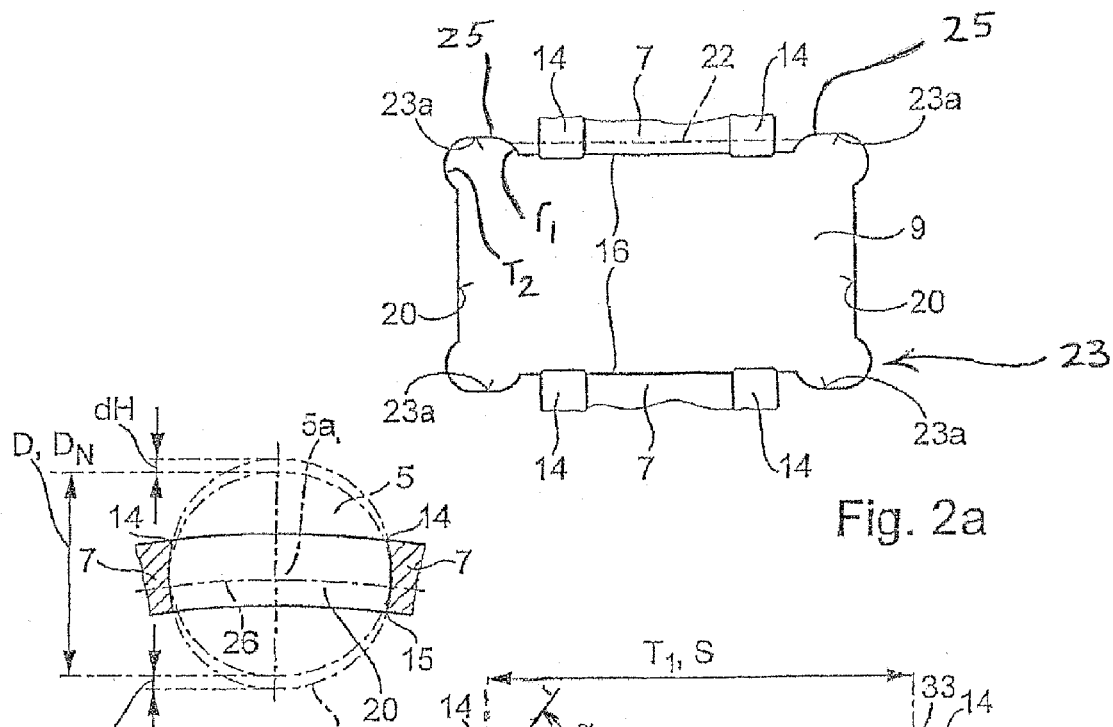
Fig. 2a
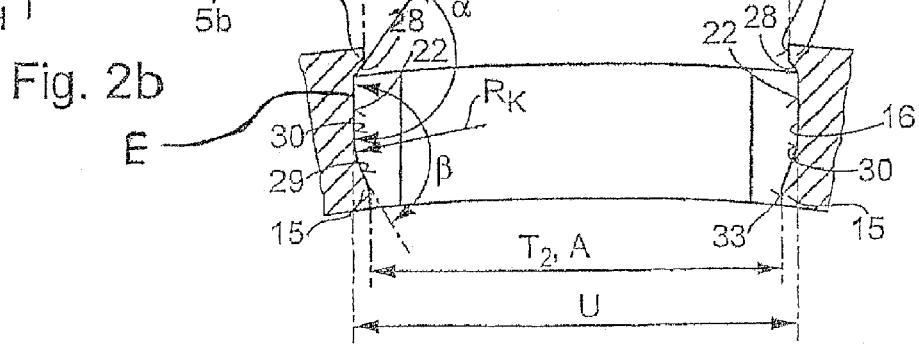
Fig. 2b
Fig. 2c

CAGE FOR ANTIFRICTION BEARINGS WITH ROLLERS

FIELD OF THE INVENTION

The invention relates to a cage for antifriction bearings with rollers, having a first side edge, having a second side edge, having webs and having pockets, which are situated adjacent to one another at the periphery, for rollers, the webs and the side edges being formed in one piece with one another and:

the webs between the first side edge and the second side edge being aligned along the rotational axis of the cage, each of the pockets being delimited at the periphery by flanks, which are situated opposite one another peripherally, on the webs, each of the pockets being delimited by inner flanks, which are situated opposite one another along the rotational axis, of the side edges, the largest free tangential spacing between the flanks on opposite sides of one of the pockets being greater than the largest diameter of the respective roller in the pocket, retainers for the rollers being formed on the webs, the largest free tangential spacing between two retainers on opposite sides of one pocket being smaller than the largest nominal diameter of the respective roller in the pocket, and at least the flanks having a finished profile-milled contour which is the finished contour of a negative image of a positive outer cutting contour of at least one profiling milling cutter.

BACKGROUND OF THE INVENTION

A cage of the type described above is described in DE 100 21 089 A1. The pockets of the cage are machined with profile milling cutters whose external cross-sectional contour reflect a positive profile for a finished negative profile of the respective machined face on the inside of the pocket. The rotationally symmetrical profiled milling cutters which rotate about a tool axis are introduced initially radially into a previously prepared hole in the cage blank, and then are moved either in the peripheral or tangential direction of the cage or axially in the peripheral direction in order to mill the contour of the flanks, which will later face the pockets, on the corresponding web, and axially in order to mill the inner flanks on the side edges, which are usually annular, and the corner radii. The corners of the pockets are also machined out using one of the profiling milling cutters, usually with the profiling milling cutter for the inner flanks.

The tangential or peripheral free tangential flank spacing in a pocket between the flanks, which face one another across a pocket, on the webs is greater than the nominal diameter of the roller in the pocket plus the permissible added tolerance of the nominal diameter. The roller is accordingly moveable within the pocket tangentially and also radially within a movement play, from one flank to the other flank, between the two flanks which are opposite one another. The rollers run in the cage in a predetermined fashion on the flanks which face into the pockets. A disadvantage of the cage design described in DE 100 21 089 A1 could be that an insufficient quantity of lubricant is present between the curved cage running face on the web and the roller which runs thereon. Friction is then relatively high. Impermissible wear and/or excessively high temperatures result from high levels of friction.

The retainers formed on the pockets retain the rollers during transport and during handling at the assembly stage. At least one retainer is formed on each of the webs which delimit the pocket. Each of the retainers of an interacting pair of at least two retainers on opposite sides of the pocket protrude tangentially toward one another from the respective web. The rollers are held in the cage radially by means of the retainers because the widest separation between the retainers which protrude tangentially or peripherally into the pockets is smaller than the nominal diameter of the rollers minus the permissible negative deviation of the nominal diameter (permissible negative tolerance for the rollers). There are cages on which the corresponding retainers are formed radially at the outside or radially at the inside and also cages on which the corresponding retainers are formed both radially at the outside and radially at the inside.

It is necessary in any case, in particular in the latter case, to snap the rollers into the cage either radially from the outside or radially from the inside. In the process, the roller is pressed radially against the retainers of a pocket until said retainers give way and the roller snaps into the pocket. In the worst case, said forces are very high if, for example, the tangential spacing is produced with the lowest permissible tolerance of the spacing, and the roller has the greatest permissible diameter. The tangential separation between the retainers which are situated opposite one another is accordingly to be adapted not only to the retaining function but also to the "snapping-in function" of the retainers. It is also to be ensured that the retainers, if possible, deflect only elastically, in order to avoid deformation of the retainers and damage to the rollers (scrape marks from the retainers on the rollers).

SUMMARY OF THE INVENTION

The object of the invention is therefore to produce a cage for rollers having an optimum inner geometry for the running of the rollers and having an arrangement of retainers which is optimally suitable for snapping the rollers in. The cage should be cost-effective to produce by means of profile milling (form milling).

The invention relates to all cages made in particular from steel, nonferrous metals or light metals and alloys thereof. The finished inner profile of the pockets is produced on the cage, which is formed in one piece from side edges and webs, by means of profile milling.

The object is achieved by means of the features of the characterizing part of claim 1 and of a further independent claim.

The profiling milling cutter used for milling the flanks on the webs of the cage according to the invention has, at the outside, a cross-sectional contour, as viewed along the profiling milling cutter rotational axis, which is a positive counter-shape for a negative finished contour of the flanks on the webs. The negative counter-shape on the web is considered in arbitrary section planes of the cage which intersect the cage transversely with respect to the cage and are penetrated perpendicularly by the rotational axis.

Accordingly, the flanks, which face into the respective pocket on the webs have each at least one plane running face, which faces toward the pockets, for the respective roller in the pocket. The running faces of a pocket, which face toward one another, are preferably aligned parallel to one another and therefore simultaneously parallel to a radial plane which proceeds from the rotational axis and runs in the same direction as the latter. The running faces which are formed on one web, face away from each other and each point into a different pocket are therefore preferably inclined relative to one another.

The plane running face adjoins at least one of the retainers radially. The retainer protrudes beyond the running face at least tangentially into the pocket or alternatively above or below the pocket in the direction of the roller. Each of the rollers accordingly runs in the pocket against a plane running face and not a curved running face. The contact point with the cage during operation of an antifriction bearing is therefore, without osculation, a pure line of contact between the lateral surface of the roller and the running face is constant and stable.

The curvature of the cylindrical surface of the roller in the pocket therefore results in the smallest spacing free spacing (sum of a pocket) between the roller and the running face being the movement play. All other adjoining spacings between the roller and the running face radially inward in the direction of the rotational axis of the cage and radially outward away from the rotational axis increase with increasing distance from the smallest spacing. The resulting air gap between the roller and the respective flank is therefore wedge-shaped. The lubricant, oil or grease, forms a wedge shape before entering the contact point, and passes into the contact point tangentially with respect to the periphery of the roller. This ensures a constant supply of lubricant to the contact point. As a result of the substantially only tangential force components on the cage from the contact point, friction-promoting radial force components are avoided. The thermal energy resulting from the friction in the contact point is significantly lower. The lubricant is loaded to a lesser extent as a result of the lower operating temperatures.

The running face extends in the radial region of the web at least to such an extent that the reference circle, which is preferably common to all the rollers of the cage, penetrates the plane faces of the webs in each case on opposite sides of the pockets in the peripheral direction at the contact point. The reference circle is a term which is known to a person skilled in the art of antifriction bearing technology and defines a circle which runs about the rotational axis of the respective bearing/cage and intersects the central axes of all the rollers, which have the same nominal diameter, when said rollers bear radially against at least one raceway of the bearing arrangement. The central axes of the rollers are the rotational axes of the rotationally symmetrical roller and generally run parallel to the rotational axis of the cage/bearing. The tangential running contact of each roller is also ensured in that the maximum free tangential spacing on the reference circle, between the roller situated in the pocket and the webs is less than any further free tangential spacing, adjoining the reference circle radially above or radially below the latter, between the roller and the webs.

The supply of lubricant to the contact point is further improved when the retainer which adjoins the running face radially has an inclined face which faces into the pocket. In addition, the spacing between the inclined face and the roller preferably increases with increasing distance from the smallest spacing, defined by the movement play, between the roller and the running face. The inclined face is inclined at an obtuse angle relative to the running face. As a result of the rollers running about their central axes, a lubricant wedge is formed at the inclined face of the retainer and is drawn between the running face and the roller by means of the roller.

Alternatively, the retainer has a curved face which merges into the running face. The curved face either merges, as a transition face, into the running face from an inclined face which faces into the pocket as mentioned previously, or the retainer is generally defined at the pocket side by a face which is curved in such a way and merges into the running face. In addition, the spacing between the curved face and the roller preferably increases with increasing distance from the smallest spacing, defined by the movement play, between the roller and the running face. The curvature of the face is preferably defined by a radius in a longitudinal section of the cage along the rotational axis. Here, the radius is greater than half of the nominal diameter of the roller in the respective pocket.

A further embodiment of the invention relates to the design of the pocket corners. Pocket corners are to be understood as the generally right-angled transition of the webs into the side edges. It is known that stress peaks occur in the pocket corners of loaded cages having small transition radii from the web to the side edge, which stress peaks can lead to cracks in and disintegration of the cages. Said pocket corner radii should therefore be as large as possible. It is additionally necessary in profile-milled pockets to provide a run-out in the corners for the profiling milling cutters, said run-out preventing overlaps in the corner between the milling contour of the axially guided and of the longitudinally guided profiling milling cutter. The running face therefore preferably runs longitudinally not over the entire width of the web but, aligned in the same direction as the rotational axis, from one pocket corner to a further pocket corner up to in each case one curved corner face. The pockets are bulged in a convex fashion into the web at least at points at the corners by means of the corner faces. The corners are defined by a corner face which extends from the running face to the inner flanks and whose contour is preferably defined by at least one radius.

As mentioned in the introduction, there are cages on which the corresponding retainers are formed a.) radially at the outside or b.) radially at the inside—and also cages on which retainers are formed c.) both radially at the outside and radially at the inside. Accordingly, embodiments of the invention provide that:

a) at least one pair of retainers engages partially radially behind the respective roller in the pocket, radially above the central axis of the roller-outer retainers b) at least one pair of retainers engages partially radially behind the respective roller in the pocket, radially below the central axis of the roller-inner retainers or c) the plane running face is arranged radially between two of the retainers, with the retainers projecting at least tangentially beyond the running face, so that in each case one pair of outer retainers on opposite sides of the pocket engage partially radially behind the respective roller in the pocket, radially above the central axis, and in each case one further pair of inner retainers on opposite sides of the pocket engage partially radially behind the roller, radially below the central axis of the roller.

The previously stated features of the invention can optionally also be combined with those of the further independent claim, according to which at least some of the webs of the cage have at least one retainer, which protrudes radially beyond the web from the web. However, the independent claim provides features which can also be considered separately from the previously stated features. With the cage according to the invention, however, the friction, the wear and, as a result, the temperature in the contact point between the rollers and the flanks are uniformly reduced. The cage also has a light weight.

As a result of at least some but preferably all of the webs having at least one retainer which protrudes radially beyond the web from the web, the weight of the cage is considerably reduced. It is also possible in the arrangement described in the following to provide gap cross sections of large dimensions for improved oil throughflow in the cage.

If, as is the case according to one embodiment of the invention, the retainer protrudes radially beyond the first side edge and beyond the second side edge, the radial installation depth of the side edge and therefore its moving weight is lower. The radial gap dimension between the cage side edge and a rim of a running ring or of a raceway of the antifriction bearing is larger. In this case, the radially aligned lateral surfaces are preferably at the same distance from the rotational axis at those side edges at which the retainer protrudes radially beyond the side edges. The resulting increased gap between the side edge of the cage and a raceway is preferably at least 0.6 to 0.9 times the nominal diameter of the roller, resulting in the radial spacing of the retainer being smaller than 0.6 times to 0.9 times the roller.

If the retainer(s) terminate at the side edge of the cage at the same height radially, the maximum radial extent to which the retainer protrudes beyond the web is the same as the maximum extent to which at least one of the side edges, preferably all of the side edges, radially aligned in the same direction as the retainer, protrudes beyond the web. In this case, an increased radial gap is produced between a raceway and the webs. In both of the previously stated cases, radially increased gap cross sections are provided from the cage to the environment for improved lubricant circulation in the bearing.

The radially protruding retainer can, but need not, be produced by means of the profiling milling cutter which machines the flanks.

The throughflow of lubricant in the cage is further improved if the cage has at least two retainers per web instead of one retainer which extends from pocket corner to pocket corner. The retainers on the common web are spaced apart from one another axially of the cage, that is to say in the longitudinal direction of the rotational axis. Additional lubricant can be conducted between the retainers to or from the contact point in the cage and the point of rolling contact on the running faces. Moreover, the resistance against the snapping-in action of rollers is lower with two narrow retainers than with retainers which extend longitudinally from corner to corner. The formation of scrape marks on the rolling bodies as a result of the snapping-in action is avoided, and any scrape marks are kept away from the main loading zone of the rollers.

The cage according to the invention is suitable both for holding cylindrical rollers and also for holding spherical rollers. One embodiment of the invention therefore also provides that the largest tangential separation between two retainers on opposite sides of one roller at the narrowest point tangentially is at least smaller than the smallest dimension of the diameter of the roller at the narrowest point. The diameter of the roller is, in the case of cylindrical rollers, at the narrowest point equal to the nominal diameter, but in the case of spherical rollers, because of the decreasing diameter towards the end sides of the rollers, said diameter is smaller than the nominal diameter at the narrowest point. The designation diameter includes the conventionally permissible diameter tolerances of the rollers.

The tangential separation can therefore be expanded elastically at least to the size of the largest dimension of the diameter of the roller at the narrowest point by means of elastic deformation of the retainers, which are situated opposite one another, at the narrowest point by means of the roller. The tangential separation is preferably at least one thousandth of one millimeter smaller than the smallest dimension of the diameter of the roller at the narrowest point.

The invention is also applicable to all single-part cages which i.) are guided on the outer rim, ii.) are guided on the inner rim or iii.) are guided by the rolling bodies. The cages encircling between the running rings of a bearing arrangement are optionally:

i.) guided on outer rims or on the outer raceways of an outer running ring of the bearing arrangement. It is the case for this arrangement that the maximum radial annular gap between the respective cylindrical outer peripheral faces of the side edges and the respective radially outwardly situated guide rim is smaller than the radial movement play by which the roller is moveable in the pocket between one pair of inner retainers and one pair of outer retainers (roller sag). Here, at the same time, the radial annular gap between the cylindrical inner lateral surface of the side edges and the respective radially inwardly situated inner rim or an inner raceway is larger than the gaps between the cylindrical outer peripheral face of the side edges to the guide rim. Accordingly, for example as a result of centrifugal forces during operation, the cage is pressed radially outward against the guide rims, and slides there along the outwardly situated guide rim, so as to be guided by the latter, in the peripheral direction, without the cage being impeded by means of the inner retainers against the rollers, and without the inner lateral surfaces of the side edges of the cage coming into contact with the respective inner rim.

ii.) guided on the inner rim or on the inner raceways of an inner running ring of the bearing arrangement. It is the case for this arrangement that the maximum radial annular gap between the cylindrical inner peripheral faces of the side edges and the respective radially inwardly situated guide rim is smaller than the radial movement play by which the roller is moveable in the pocket between one pair of inner retainers and one pair of outer retainers (roller sag). At the same time, the radial annular gaps between the cylindrical outer lateral surfaces of the side edges and the respective radially outwardly situated rim or an outer raceway are larger than the gaps between the cylindrical inner peripheral faces of the side edges to the guide rim. Accordingly, for example as a result of centrifugal forces during operation, the cage is pressed radially against the inner rim, and slides there along the guide rim, so as to be guided by the latter, in the peripheral direction, without the cage being impeded by means of the outer retainers against the rollers, and without the outer lateral surfaces of the side edges of the cage coming into contact with the respective outer rim.

iii.) guided by the rolling bodies. It is the case for this arrangement that the respective maximum radial annular gap between the cylindrical inner peripheral faces of the side edges and the respective radially inwardly situated rims/raceways as well as the maximum radial annular gap between the cylindrical outer peripheral faces of the side edges and the radially outwardly situated rims/raceways is greater than the radial movement play by which the roller is moveable in the pocket between one pair of inner retainers and one pair of outer retainers (roller sag). Accordingly, for example as a result of centrifugal forces during operation, the cage is moved radially outward and is held by the inner retainers against the rollers, without coming into contact with the inner or outer rims.

As a result:

the retainers protrude radially beyond the web radially outward from the cage—this applies predominantly to ii.) but optionally also to iii.)

the retainers protrude radially beyond the web radially inward from the cage—this applies predominantly to i.) but also to ii.).

Further embodiments and exemplary embodiments for designing the retainers are described in more detail in the section "Description of the drawings".

BRIEF DESCRIPTION OF THE DRAWINGS

The present invention will be better understood and appreciated by reading the following detailed description in conjunction with the accompanying drawings, in which:

FIG. 2 is a longitudinal sectional view through a pocket of the present invention;

FIG. 2a is a plan view of the pocket of FIG. 2;

FIG. 2b is a cross-sectional view long the pocket of FIG. 2;

FIG. 2c is an enlarged view of FIG. 2b;

DESCRIPTION OF THE DRAWINGS

Figure 1:
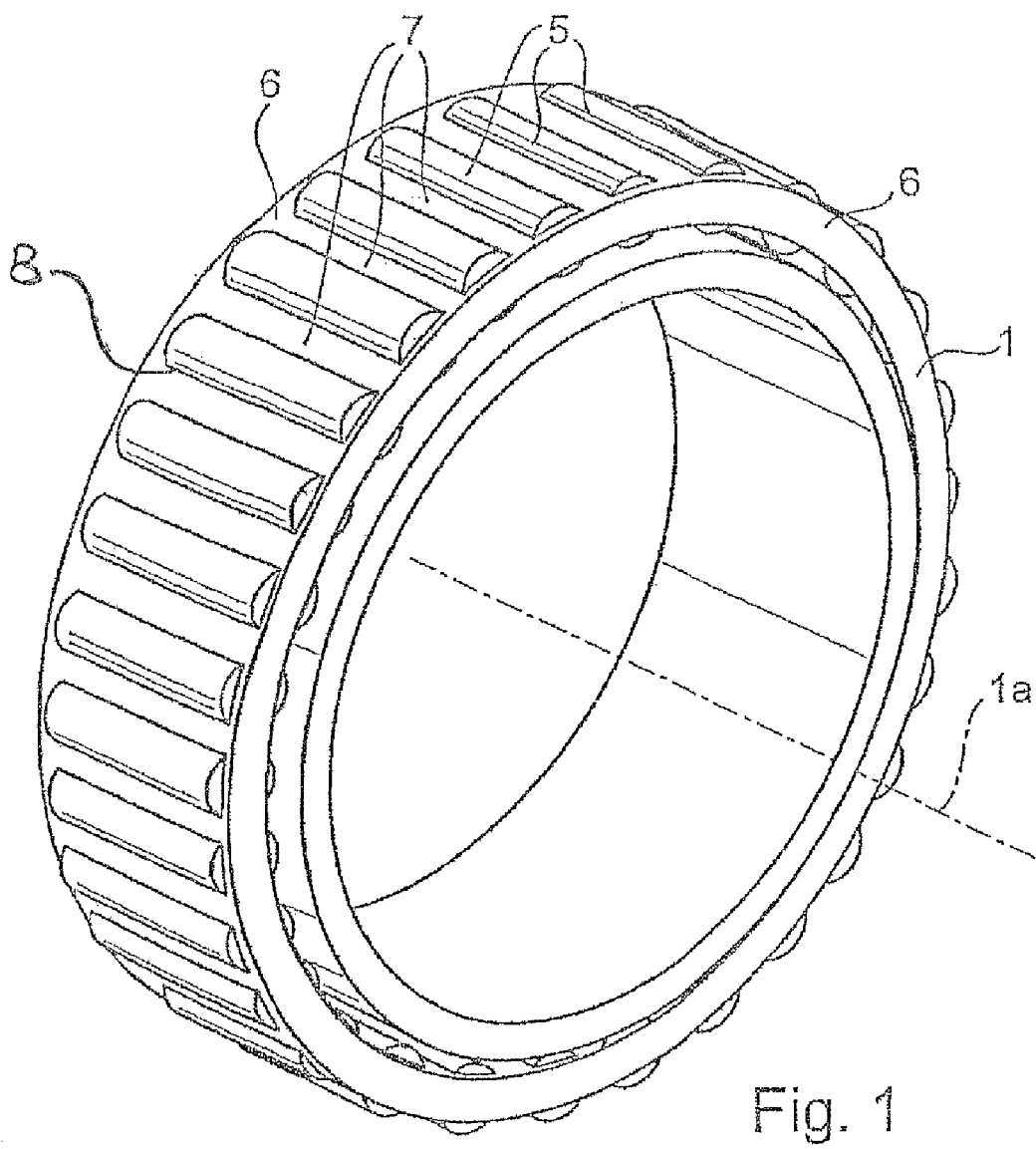
FIG. 1 is a perspective view of the cage for antifriction bearings with rollers.

Referring now to the drawings, in which like reference numerals refer to like parts throughout, FIG. 1 shows, in simplified form, an exemplary embodiment at a cage 1 for antifriction bearings with rollers 5, having a first side edge 6, having a second side edge 6, having webs 7 and having pockets 8, which are situated adjacent to one another at the periphery, for the rollers 5. The cage 1 is formed in one piece with the webs 7 and the side edges 6. The webs 7, between the first side edge 6 and the second side edge 6, are aligned along the rotational axis 1a of the cage.

FIG. 2 shows, by way of example, the longitudinal section through a pocket 9 along the rotational axis, in this case for a cage 2 which is guided on the inner rim of an inner ring (not illustrated). FIG. 2a shows the plan view of the pocket 9. FIG. 2b shows the cross section along the pocket 9, transversely with respect to the rotational axis, with a roller 5, and FIG. 2c shows an enlarged view, which is not to scale, of the cross section from FIG. 2b.

Figure 3:
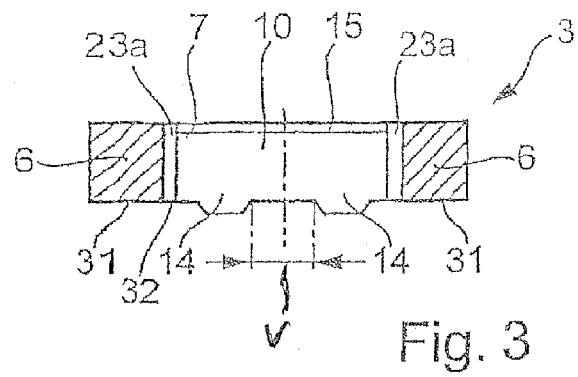
FIG. 3 is a longitudinal sectional view through an alternate embodiment of a pocket of the present invention.
Figure 3A:
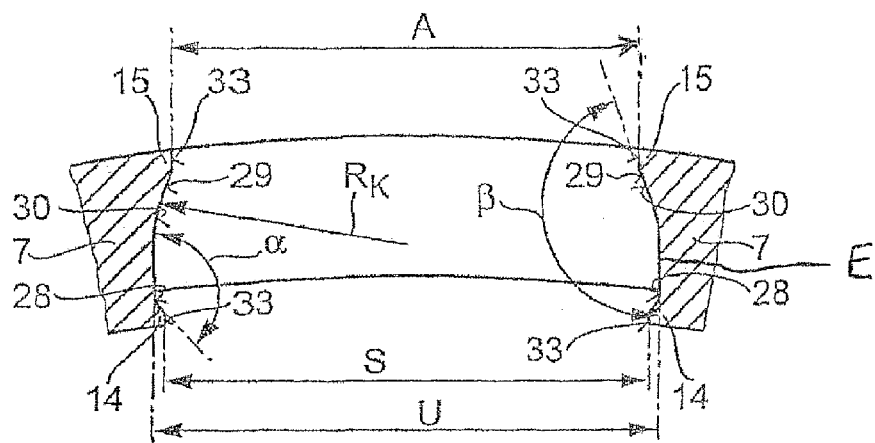
FIG. 3a is a cross-sectional view of the pocket of FIG. 3.
Figure 4:
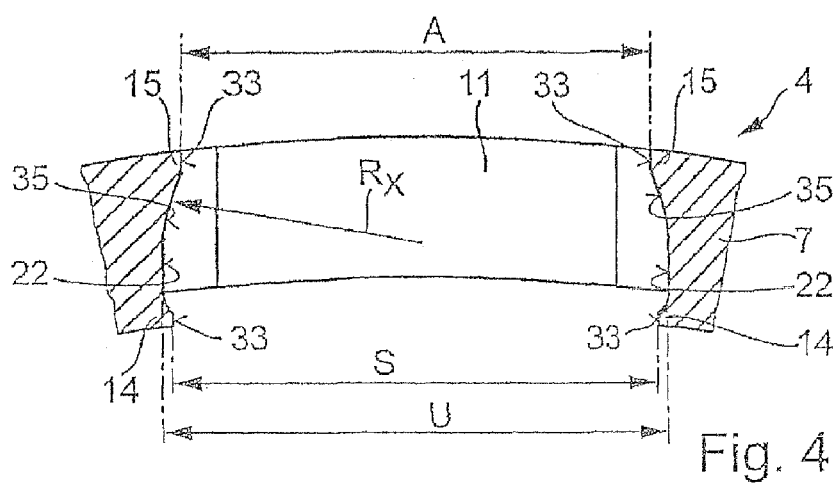
FIG. 4 is a sectional view of the pocket of FIG. 3

FIG. 3 shows, by way of example, the longitudinal section through a pocket 10 along the rotational axis of the cage for a cage 3 which in this case is guided on the outer rim of an outer ring (not illustrated) or is guided by means of the rollers 5. FIG. 3a shows the cross section of the pocket, sectioned transversely with respect to the rotational axis, for the cage 3 guided on the outer rim, and FIG. 4 shows the section of the pocket 11 transversely with respect to the rotational axis for the cage 4 which is guided by means of the rollers; both illustrations are enlarged and are not to scale.

Figure 5:
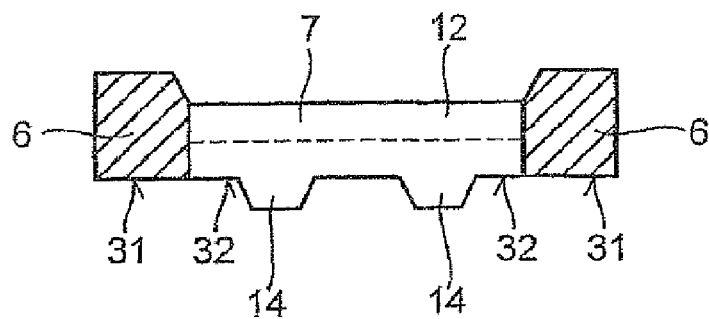
FIG. 5 is sectional view along a further alternate embodiment of a pocket of the present invention.
Figure 5A:
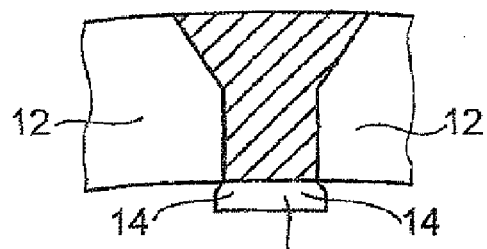
FIG. 5a is a sectional view of the pocket shown in FIG. 5.

FIG. 5 is a simplified sectional illustration along a further pocket 12, in which the retainers 14 protrude radially beyond the web and the side edges in the direction of the rotational axis. FIG. 5a illustrates the pocket 12 in a section plane running transversely with respect to the rotational axis.

Figure 6:
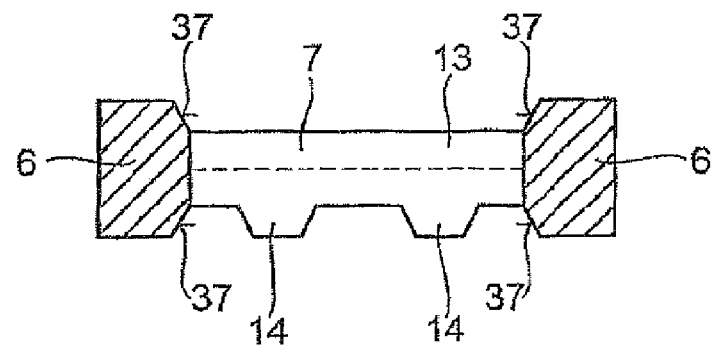
FIG. 6 is a sectional view along yet a further alternate embodiment of a pocket of the present invention.
Figure 6A:
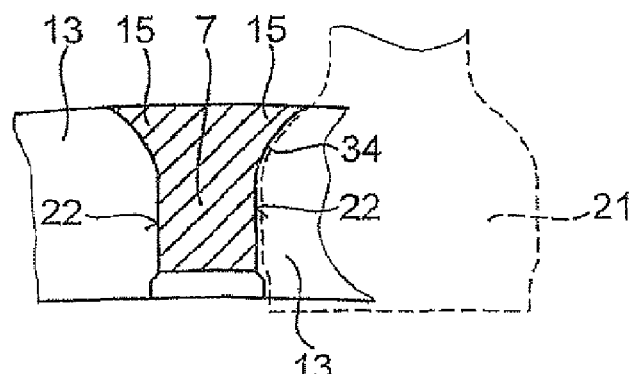
FIG. 6a is a sectional view of the pocket shown in FIG. 6.

FIG. 6 is a simplified sectional illustration along a further pocket 13, in which the retainers 14 protrude radially beyond the web 7 in the direction of the rotational axis and terminate at the same height as the side edges 6. FIG. 6a illustrates the pocket 13 in a section plane running transversely with respect to the rotational axis.

Figure 7:
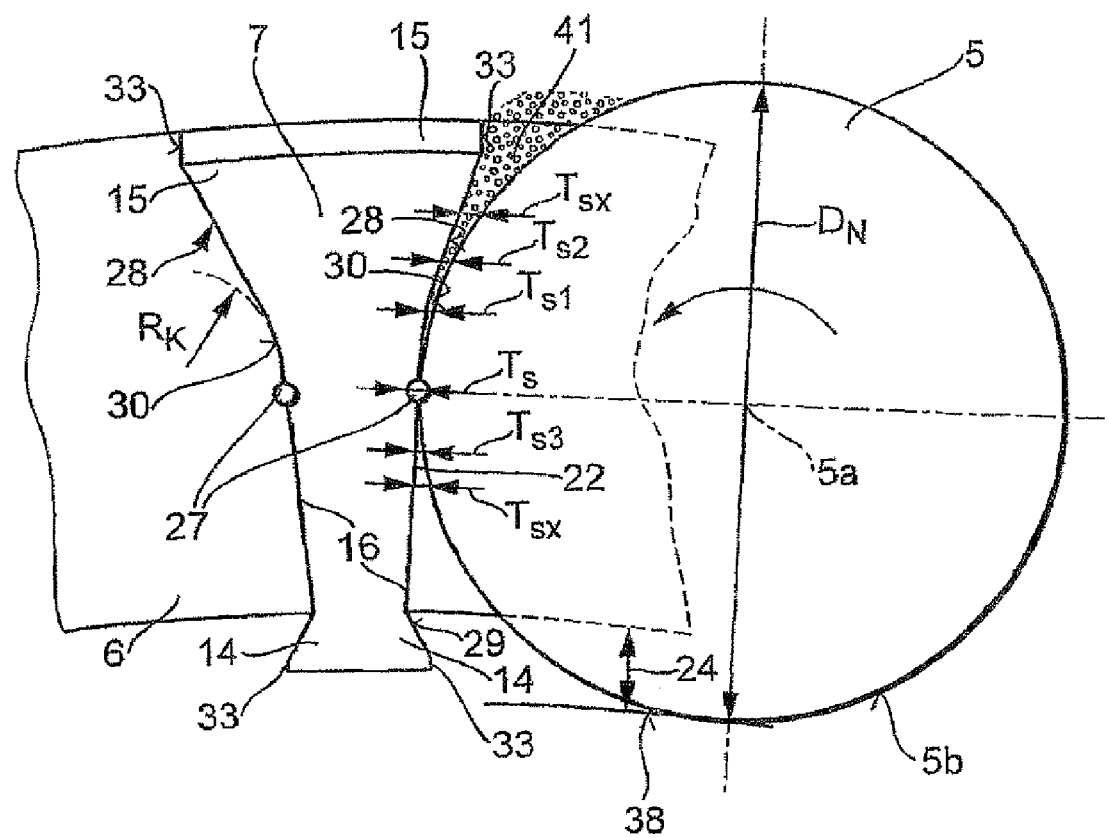
FIG. 7 is a schematic of a contact point between a roller and flank of the present invention.

FIG. 7 shows, in a schematic and greatly enlarged view, the contact point between a roller 5 and a flank 16 of a web.

Figure 8:
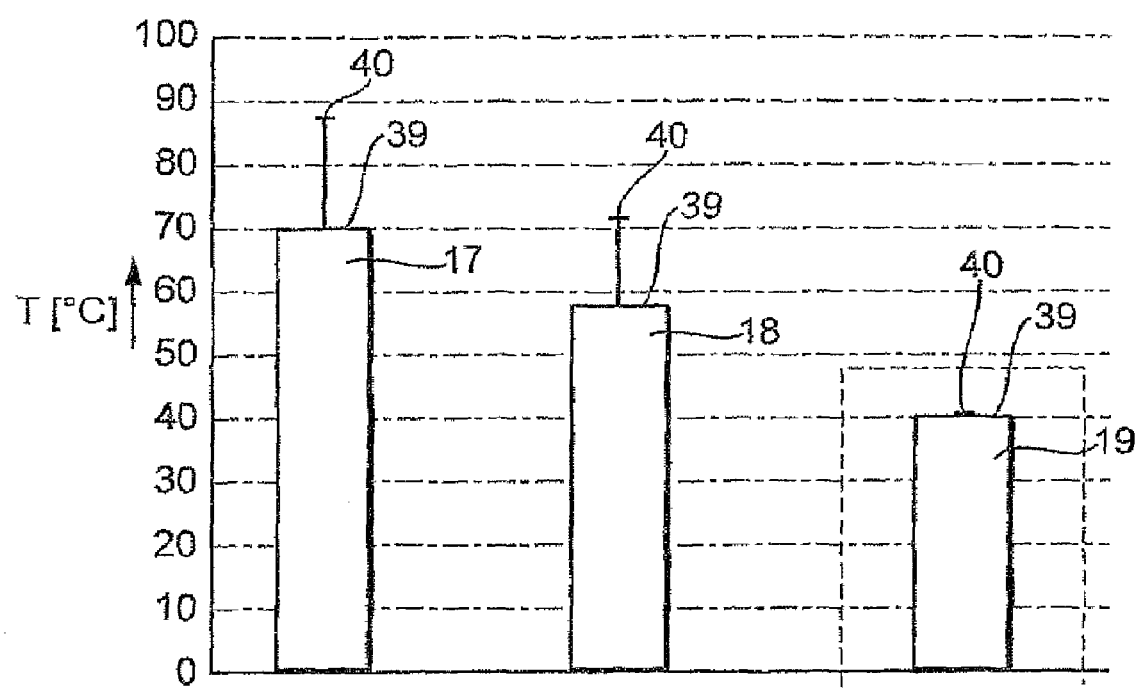
FIG. 8 is a graph comparing temperature measurement results during operation with different embodiments of single-piece cages.

FIG. 8 compares the measurement results of temperature measurements during operation of rolling bodies 17, 18, 19 with different embodiments of single-piece cages.

The pockets are delimited peripherally by opposite flanks 16 on the webs 7 and by two inner flanks 20, which are situated opposite one another along the rotational axis, of the side edges 6. The largest free tangential spacing U between the flanks 16 on opposite sides of one of the pockets 8, 9, 10, 11 is greater than the largest diameter D of the respective roller 5 in the pocket 8, 9, 10, 11. Retainers 14, 15 for the rollers are formed on the webs 7. The greatest free tangential spacing $T_1$ and $T_2$ between two retainers 14, 15 in each case on opposite sides of one pocket 8, 9, 10, 11 is smaller than the largest nominal diameter $D_N$ of the respective roller 5 in the pocket 8, 9, 10, 11.

The flanks 16 have a finished profile-milled contour which is a negative image of a positive outer cutting contour of a profiling milling cutter 21 illustrated by dashed lines in FIG. 6a. The flanks 16 in each case have at least one plane running face 22, which faces toward the pockets 8, 9, 10, 11, for the respective roller 5 in the pocket 8, 9, 10, 11, the running face 22 being formed radially between the radially inner retainer 14, 15 and the radially outer retainer 14, 15. The retainers 14, 15 protrude tangentially beyond the respective running face.

The retainers 14 and 15 engage partially radially behind the respective roller 5 in the pocket 8, 9, 10, 11, radially above the central axis 5a of the roller 5 and radially below the central axis 5a of the roller 5. Consequently, in each case one pair of retainers 14 and/or 15 which is situated on opposite sides of the pocket 8, 9, 10, 11 and proceed from two webs 7 situated adjacent to one another on the pocket 8, 9, 10, 11 engage partially radially behind the respective roller 5 in the pocket 8, 9, 10, 11, radially above the central axis 5a, and in each case one further pair of retainers 14 and 15 on opposite sides of the pocket 8, 9, 10, 11 engage partially radially behind the roller 5, radially below the central axis 5a.

The running face 22, aligned in the same direction as the rotational axis longitudinally, runs from one pocket corner 23 to a further pocket corner 23 (FIG. 2a). The webs 7 merge into one of the side edges 6 at the corners 23. The running faces 22 in each case merge into a corner face 23a, which runs in a curved fashion, at the corners 23. The pocket 8, 9, 10, 11 is bulged in a convex fashion into the web 7 at least at points at the corners 23 by means of the corner faces 23a. Here, the bulge is defined by the radii $r_1$, $r_2$ and a plane face 25 at which the curved sections of the corner face 23a end. The radii $r_1$ and $r_2$ correspond to 0.05 times to 0.2 times the nominal diameter $D_N$ of the respective roller 5 in the pocket.

FIG. 7 shows the manner in which the rollers 5 run on the contact point 27 in the peripheral direction. The maximum free spacing $T_S$ formed between the contact point 27 and the roller 5 is smaller than any other free tangential spacing $T_{S1}$-$T_{SX}$, adjoining the reference circle radially above or radially below the latter, between the roller 5 between the webs 7 in the pocket. It is to be considered that, in order to describe the free spacing $T_S$ (pocket play), the roller in the illustration of FIG. 7 is in contact with the opposite contact point (not illustrated) on the other web of the same pocket.

The retainers 14, 15 have in each case one inclined face 28 and 29 respectively which faces into the pocket, each of the inclined faces 28, 29 being inclined at an obtuse angle relative to the running face. The retainers 14 merge, with a negligible radius, into the running face 22 at the pocket side of the inclined face 28. A curved face 30 adjoins the inclined face 29 at the retainers 15. The inclined face 29 and the face 30 run in the same direction as the rotational axis along the pocket 8, 9, 10, 11. The face 30 is curved out of the pocket 8, 9, 10, 11 in a convex fashion. The curvature is defined by the radius $R_K$ which is greater than the nominal diameter $D_N$ of the roller 5. The lubricant, oil or grease, forms a wedge shape before entering the contact point 27, and passes into the contact point tangentially with respect to the periphery of the roller (FIG. 7). This ensures a constant supply of lubricant to the contact point 27. As a result of the rollers running about their central axes 5a, in this case in the direction of the arrow, the lubricant wedge 41 is pre-formed at the inclined face 28, 29 of the retainer 14, 15 and is drawn between the running face and the roller by means of the roller 5.

The cage 2, which is guided on the inner rim, in FIGS. 2 to 2c has two first retainers 14 (in this case outer retainers) which protrude radially beyond the web 7 and the side edges 6, and one second retainer 15 (in this case inner retainer) which protrude tangentially into the pocket, on each web 7. The retainers 14 on the common web 7 are spaced apart from one another axially, that is to say in the longitudinal direction of the rotational axis, and are each at the same distance from the pocket center M. The two retainers 14 are at the same distance from the rotational axis.

The retainer 15 runs longitudinally between the corner faces 23a. The radially outwardly aligned lateral surfaces 31 on the side edges 6 and the radial top border or lateral surface 32 for radially delimiting the web 7 are at the same distance from the rotational axis.

As can be seen from FIG. 2b, in each case one roller 5 per pocket 9 is held in the pocket 9 radially at the outside by the retainers 14 and radially at the inside by the retainers 15. Here, the roller 5 is freely radially moveable in the pocket 9 within a predetermined sag dH. The retainers 14 are in each case defined by an end face 33 which faces the pocket 9 and an inclined face 28 which adjoins the end face 33 radially at the inside (FIG. 2c). The inclined face 28 is inclined at an angle α relative to a plane E which runs parallel to the longitudinal plane of the cage.

The retainer 15 has an end face 33, which is adjoined radially at the inside by an inclined face 29. The inclined face 29 is inclined by an angle β relative to a plane which runs parallel to the rotational axis of the cage 2. As viewed tangentially with respect to the cylindrical outer lateral surface 5b of the roller 5, the inclined face 29 merges into the running face 22 via a curved face 30 defined by the radius $R_K$. The tangentially narrowest point between the retainers 14 at opposite sides of a pocket is the snapping-in dimension S. The cage 2 is accordingly filled with the rollers 5 radially from the outside. The narrowest spacing A between the retainers 15 is smaller than the snapping-in dimension S.

The cage 3, which is guided on the outer rim, in FIGS. 3 to 3a has two retainers 14 which protrude radially inward beyond the web 7 and the side edges 6, and one retainer 15 which protrudes tangentially into the pocket, on each web 7. The retainers 14 on the common web 7 are spaced apart from one another axially, that is to say in the longitudinal direction of the rotational axis, and are each at the same distance from the pocket center M. The axial spacing V between the retainers 14 corresponds at the narrowest point to at least two fifths to one quarter of the axially aligned length of the respective roller in the pocket. The retainer 15 runs longitudinally between the corner faces 23a. The radially outwardly aligned lateral surfaces 31 on the side edges 6 and the radial top border or lateral surface 32 for radially delimiting the web 7 are at the same distance from the rotational axis.

The radially inwardly situated retainers 14 are in each case defined by an end face 33 which faces the pocket 10 and an inclined face 28 which adjoins the end face 33 radially at the inside (FIG. 3a). The inclined face 28 is inclined about an angle α relative to a plane which runs parallel to the longitudinal plane of the cage 3.

The retainer 15 has an end face 33, which is adjoined radially at the inside by an inclined face 29. The inclined face 29 is inclined about an angle β relative to a plane E which runs parallel to the rotational axis of the cage 3. As viewed tangentially with respect to the cylindrical outer lateral surface 5b of the roller 5, the inclined face 29 merges into the running race 22 via a curved face 30 defined by the radius $R_K$. The radius $R_K$ is greater than half of the nominal diameter $D_N$ of the roller 5. The tangentially narrowest point between the retainers 14 at opposite sides of a pocket is the snapping-in dimension S. The snapping-in dimension S is at least one thousandth of one millimeter smaller than the smallest dimension of the diameter of the roller 5 at the narrowest point between the retainers 14. The cage 2 is accordingly filled with the rollers radially from the inside. The narrowest spacing A between the retainers 15 is smaller than the snapping-in dimension S, and corresponds to 0.92 times to 0.96 times the nominal diameter $D_N$ of the roller 5 in the pocket 10.

In the case of the cage 4 in FIG. 4, the two retainers 15 on the webs have the end face 33, said end face 33 adjoining a curved face 35 defined by the radius $R_X$. The face 35 merges into the running face 22.

At least the flanks 16, which are situated on opposite sides of a pocket 8, 9, 10, 11, of the respective retainers 14, 15 on the webs 7 of the cages 1, 2, 3 have a profile-milled contour.

The illustrations of FIGS. 5 and 5a illustrate how the retainers 14 protrude radially inward beyond the side edges 6 and the web 7. The radially-inward-facing lateral surfaces 31, 32 of the side edges 6 and of the webs 7 terminate at the same radial height. The retainers 14 which, on one web 7, face away from one another and face in each case a different one of two adjacent pockets, are formed on a common rib 36 which extends in the peripheral direction between in each case two adjacent pockets 12.

FIGS. 6 and 6a show the pocket 13 of a cage in which the maximum radial extent to which the first retainer 14 (in this case inner retainers) protrudes beyond the web 7 is the same as the maximum extent to which at least one of the side edges 6, radially aligned in the same direction as the first retainer 14, protrudes beyond the web 7. Accordingly, in this cage, the retainers 14 protrude radially inward beyond the web 7, but not beyond the side edges 6. The running faces 22 merge into a curved face 34 at the second retainers 15 (in this case outer retainers).

The side edges 6 in FIGS. 5 and 6 have a chamfer 37 in each case at the inside and at the outside on those parts of the side edges 6 which protrude radially beyond the webs 7. The chamfer 37 serves to reduce stress peaks and to reduce the weight of the cages.

It can be seen from FIG. 7 that the retainers 14 protrude radially inward beyond the web 7 and beyond the side edges 6, and that the smallest radial spacing 24 from the side edges 6, at that radial side of the side edges 6 beyond which the first retainer 14 protrudes, to a surface, which adjoins the side edges 6 in the radial direction, of a raceway 38 of the rollers 5, corresponds to at least 0.6 times to 0.9 times the nominal diameter $D_N$ of the roller 5. Accordingly, the radial spacing of the first retainer 14 is less than 0.6 times to 0.9 times the nominal diameter $D_N$ of a roller 5.

The invention makes it possible for the same profiling milling cutters to be used for the profile milling of the pockets 8, 9, 10, 11 on cages 1, 2, 3, 4 in bearings of different dimensions and therefore of different load rating, but with rollers 5 of the same nominal diameter $D_N$, since the cross section of the pockets 8, 9, 10, 11 is the same and the longitudinal section is dependent only on the nominal length of the rollers 5.

FIG. 8 shows a diagram which compares measurement values, from a load engagement test WS18 performed in-house, for antifriction bearings 17, 18, 19 having single-piece brass cages NU/NUP214. Here, the test conditions where:
 radial load of 12 kN, at
 a speed of 4800 rev/min
 and with an oil throughflow at a volume flow rate of 0.3 l/min
 after a preceding running-in period at a speed of 1400 rev/min over 24 hours.

The measurement results were the maximum temperatures T at the outer ring of the respective bearing 17, 18, 19. The following were examined:
 a bearing 17 having a cage according to the prior art, with a curved running face,
 a bearing 18 having the cage according to the invention, in which the rollers run on a plane running face on the flanks of the webs, but not all the retainers protrude radially beyond the web and
 a bearing 19 having the cage according to the invention, in which the rollers run on a plane running face on the flanks of the webs, and in which in each case one pair of retainers on a web protrude radially beyond the web and radially beyond the side edges.

As can be seen from the diagram, both the statistical mean values 39 and the maximum values 40 of the temperatures of the bearing 17 are higher than the values for the bearings 18 and 19. The bearing 18 exhibits improved temperature behavior, with regard both to the statistical mean values 39 and with regard to the maximum values 40, compared to the bearing 17 according to the prior art. The temperatures of the bearing 19 are advantageously considerably lower.

LIST OF REFERENCE SYMBOLS

1 Cage
1a Rotational axis
2 Cage
3 Cage
4 Cage
5 Roller
5a Central axis
5b Outer lateral surface
6 Side edge
7 Web
8 Pocket
9 Pocket
10 Pocket
11 Pocket
12 Pocket
13 Pocket
14 Retainer
15 Retainer
16 Flank
17 Antifriction bearing
18 Antifriction bearing
19 Antifriction bearing
20 Inner flank
21 Profiling milling cutter
22 Running face
23 Pocket corner
23a Corner face
24 Spacing
25 Plane face
26 Reference circle
27 Contact point
28 Inclined face
29 Inclined face
30 Face
31 Lateral surface
32 Lateral surface
33 End face
34 Face
35 Face
36 Rib
37 Chamfer
38 Raceway
39 Mean value
40 Peak value
41 Lubricant wedge

The invention claimed is:

1. A cage for antifriction bearings with rollers, comprising:
 a first side edge, a second side edge, webs and pockets, which are situated adjacent to one another at the periphery for the rollers, the webs and the the first side edge and the second side edge being formed in one piece with one another and:
 the webs between the first side edge and the second side edge being aligned along a rotational axis of the cage, the webs being curved concavely toward the pocket,
 each of the pockets being delimited peripherally by flanks, which are situated opposite one another, on the webs,
 each of the pockets being delimited axially by inner flanks, which are situated opposite one another along the rotational axis, of the the first side edge and the second side edge,
 spacing tangentially between the flanks, on opposite sides of the pockets, being greater than a diameter of the rollers in the pockets,
 pairs of retainers for the rollers being formed on the webs,
 separation tangentially between the retainers on opposite sides of the pockets, being smaller than a diameter of the rollers in the the pockets, and
 each of the flanks having at least one plane running face, which faces toward the pockets, for one of the rollers in the pockets, the plane running face adjoining at least one of the retainers radially, with each of the retainers independently protruding beyond the plane running face at least tangentially creating additional points of contact to secure the rollers while allowing lubricant from a lubricant wedge to flow freely.

2. The cage of claim 1, wherein the running faces are penetrated by a reference circle which runs in a rotationally symmetrical fashion about the rotational axis and intersects the central axes of the rollers of the cage.

3. The cage of claim 2, wherein the maximum dimension of a free tangential movement play, on the reference circle, of the roller in the pocket between the respective roller and the webs is less than the minimum dimension of any free spacing, adjoining the reference circle radially above or radially below the latter, between the roller between the webs in the tangential direction.

4. The cage of claim 3, wherein the retainer has a plane inclined face which faces into the pocket, the inclined face being inclined at an obtuse angle relative to the running face, and any free spacing between the inclined face and the roller in the tangential direction being greater than the movement play.

5. The cage of claim 4, wherein the retainer merges into the running face at the pocket side of the inclined face.

6. The cage of claim 3, wherein the retainer merges into the running face at the pocket side of a curved face, the face running in the same direction as the rotational axis along the pocket and being curved out of the pocket in a convex fashion, and any free spacing between the curved face and the roller in the tangential direction being greater than the movement play.

7. The cage of claim 6, wherein the curvature of the face in a longitudinal section of the cage along the rotational axis is defined by a radius.

8. The cage of claim 7, wherein the radius is greater than half of the nominal diameter of the roller in the respective pocket.

9. The cage of claim 1, wherein the running face, aligned in the same direction as the rotational axis longitudinally, runs from one pocket corner to a further pocket corner, the webs merging into one of the side edges at in each ease one of the pocket corners.

10. The cage of claim 1, wherein the running faces in each case merge into a corner face, which runs in a curved fashion, at the pocket corners, the pocket being bulged in a convex fashion into the web at least at points at the pocket corners by means of the corner faces.

11. The cage of claim 1, wherein the retainer engages partially radially behind the respective roller in the pocket, radially above the central axis of the roller.

12. The cage of claim 1, wherein the retainer engages partially radially behind the respective roller in the pocket, radially below the central axis of the roller.

13. The cage of claim 1, wherein the running face is arranged radially between two of the retainers, the retainers protruding beyond the running face at least tangentially.

14. The cage of claim 13, wherein in each case one pair of retainers on opposite sides of the pocket engage partially radially behind the respective roller of a pocket, in each case radially above and radially below the reference circle.

15. The cage of claim 1, wherein at least some of the webs have at least one first retainer, which protrudes radially beyond the web from the web, of the retainers.

16. The cage of claim 1, wherein at least some of the webs have at least one first retainer, which protrudes radially beyond the web from the web, of the retainers.

17. The cage of claim 16, wherein the first retainer protrudes radially beyond the first side edge and beyond the second side edge.

18. The cage of claim 17, wherein the size of the smallest possible radial annular gap between at least one side edge and a surface of the webs, which is adjacent thereto in the radial direction, of a raceway for the rollers corresponds to at least 0.6 times to 0.9 times the nominal diameter of the roller, the annular gap being formed at the radial side of the side edge, the first retainer protruding beyond said radial side.

19. The cage of claim 16, wherein the maximum radial extent to which the first retainer protrudes beyond the web is the same as the maximum extent to which at least one of the side edges, radially aligned in the same direction as the first retainer, protrudes beyond the web.

20. The cage of claim 16, wherein at least one lateral surface for radially delimiting the web and in each case one peripheral face for radially delimiting each of the side edges are the same distance from the rotational axis radially at least at that radial side of the cage at which the first retainer protrudes.

21. The cage of claim 16, wherein at least the first retainer has a part of the profile-milled contour of the flank, the part being aligned in the direction of the respective roller situated in the pocket.

22. The cage of claim 16, wherein the first retainers of two pockets which are adjacent to one another at the periphery are formed on a web by a common rib, the rib running transversely with respect to the rotational axis between the pockets which are adjacent to one another, and protruding radially out of the web.

23. The cage of claim 16, wherein each web has at least two of the first retainers per pocket, said first retainers being spaced apart from one another axially on the web.

24. The cage of claim 23, wherein one of the first retainers which are spaced apart from one another axially is the same distance from the rotational axis as the other one of the first retainers which are spaced apart from one another axially.

25. The cage of claim 23, wherein the axial spacing between the first retainers which are spaced apart from one another axially corresponds at the narrowest point to at least two fifths to one quarter of the axial length of the respective roller in the pocket.

26. The cage of claim 23, wherein the respective axial spacing of each of the first retainers which are spaced apart from one another axially on one of the webs is the same size as a pocket central plane which is situated axially between the adjacent first retainers, the pocket central place being penetrated perpendicularly by the rotational axis.

27. The cage of claim 16, wherein the largest free tangential separation between two retainers on opposite sides of one pocket at the narrowest point is at least smaller than the diameter of the roller.

28. The cage of claim 27, wherein the retainers in each case on opposite sides of the pocket are at least partially malleable at the narrowest point by means of the roller such that the tangential separation between the deformed retainers at the narrowest point corresponds at least to the size of the maximum dimension of the diameter of the roller at the narrowest point.

29. The cage of claim 27, wherein the tangential separation at the narrowest point is at least one thousandth of one millimeter smaller than the diameter of the roller.

30. The cage of claim 16, wherein each web having at least one first retainer also has formed on it at least one second retainer, the first retainer and the second retainer being spaced apart from one another radially.

31. The cage of claim 30, wherein the second retainer is wider than the first retainer as viewed in the longitudinal direction of the rotational axis.

32. The cage of claim 30, wherein the second retainer protrudes tangentially from the respective web into the pocket.

33. The cage of claim 30, wherein the tangential separation between two of the second retainers on opposite sides of one pocket at the narrowest point is smaller than the nominal diameter of the roller in the pocket.

34. The cage of claim 33, wherein the smallest tangential separation at the narrowest point is 0.92 times to 0.96 times the nominal diameter of the roller in the pocket.

35. The cage of claim 16, wherein each of the inner flanks is defined by one plane face and, in the direction of the webs by in each case at least one part of a curved corner face of a pocket corner, the pocket being bulged in a convex fashion into the side edges, at least in the axial direction at the pocket corners, by means of the corner faces.

36. The cage of claim 35, wherein the curvatures of the corner faces are described in each case by a radius.

37. The cage of claim 36, wherein the radius corresponds to 0.05 times to 0.2 times the nominal diameter of the respective roller in the pocket.

38. The cage of claim 16, wherein the first retainers protrude radially beyond the web radially outward from the cage.

39. The cage of claim 16 wherein the first retainers protrude radially beyond the web radially inward from the cage.

* * * * *